May 3, 1927.

J. SLEPIAN

ELECTROSTATIC RADIOTUNER

Filed Aug. 3, 1921

1,626,634

WITNESSES:
O. B. Funk
O. B. Buchanan

INVENTOR
Joseph Slepian
BY
Wesley Glearr
ATTORNEY

Patented May 3, 1927.

1,626,634

UNITED STATES PATENT OFFICE.

JOSEPH SLEPIAN, OF SWISSVALE, PENNSYLVANIA, ASSIGNOR TO WESTINGHOUSE ELECTRIC AND MANUFACTURING COMPANY, A CORPORATION OF PENNSYLVANIA.

ELECTROSTATIC RADIOTUNER.

Application filed August 3, 1921. Serial No. 489,550.

My invention relates to means for offering impedance to alternating current flowing in a circuit, and particularly to electrostatic means for offering small impedance to currents of a desired frequency and large impedance to currents of other frequencies.

An object of my invention is to provide a tuner which shall be suitable for electrically resonant circuits for low-frequencies as well as high frequencies.

Another object of my invention is to devise a tuner having the property of high selectivity, which shall be, at the same time, simple in construction and operation, and positive in action.

My tuner mechanism is adapted to be connected to some source of oscillating current, such as the antenna of a receiving system, and comprises a rotor of an electro-static generator having stators connected in two phases. The rotor is provided with segments which are insulated from each other but connected by paths providing small leakage between the segments. The stators in one phase are adapted to be in circuit with the source of oscillating current, and the stators in the other phase are short-circuited. When the generator is driven at synchronous speed with respect to the frequency of the received currents, the charge on the rotor will build up to a large value so that there will be small impedance between the two stator members which are connected to the source of current. The stator members which are short-circuited bind the charge on the rotor and serve to prevent the leakage of the charge therefrom.

In the drawings: Figure 1 is a diagrammatic view illustrating my tuner mechanism connected to an antenna circuit.

Figure 1:
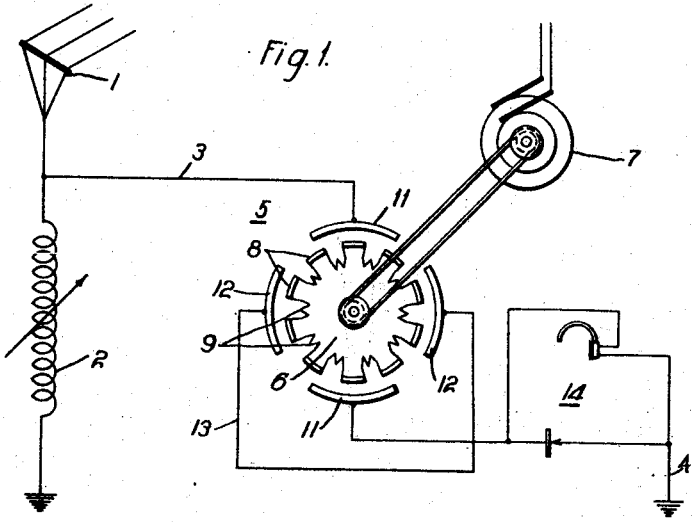

In Fig. 1 is shown an antenna circuit comprising an antenna 1, and a variable inductor 2 from whence the circuit is connected to ground. In the present instance, the distributed capacity of the antenna and windings is assumed to be sufficient to furnish the requisite capacity for the tuning of the antenna circuit to the desired frequency. Shunted around the variable inductor 2 in the antenna circuit, is a receiving circuit having a lead 3 connected to the upper end of the variable inductor 2, and another lead 4 connected to ground, thus completing an oscillatory circuit through the variable inductor 2.

My tuning mechanism 5 comprises the rotor 6 of an electro-static generator adapted to be rotated by a motor 7 at a speed synchronous to the frequency to which the system is desired to be tuned. The rotor 6 comprises a number of segments 8 insulated from each other but connected by small leaks 9. The stator is provided with members 11, which are connected to the leads 3 and 4 in the receiving circuit, and with other members 12, which are in quarter-phase relation to the members 11, are short circuited by a suitable conductor 13. In the receiving circuit is connected a suitable detecting apparatus 14 diagrammatically illustrated.

The detecting apparatus 14 may be any of the well known detecting sets employing three-electrode vacuum tubes, or detector crystals exhibiting the piezo-electric effect, etc. The type of receiving set comprises no part of my invention, and, therefore, I have shown the same only diagrammatically. The rotor 6 is adapted to rotate at a frequency synchronous with the frequency which it is desired to receive. The frequency may lie within the range of audio frequencies or may be above the range of audibility. There is no upper limit to the frequency to which my tuner may be adjusted except that imposed by mechanical limitations on the velocity of the rotor.

Figure 2:
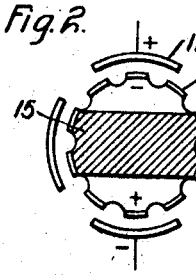
Fig. 2 is a similar view illustrating the equivalent impedance to the passage of an alternating current between the two stators which are connected to the source of oscillations, when the rotor is not rotating at synchronous speed.
Figure 3:
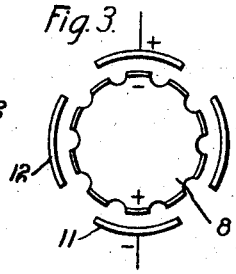
Fig. 3 is a similar view illustrating the condition of my tuner mechanism at the end of the first quarter cycle of an alternation occurring at synchronous speed.

Let us assume that the rotor is at rest or rotating at a non-synchronous frequency. There will be a large impedance to the passage of alternations between the two stator members 11 connected in the receiving circuit. Referring to Fig. 2 I have diagrammatically indicated this impedance by a shaded band 15. Let us assume that the alternation induces a positive charge on the upper stator member. This charge will induce a negative charge on the portion of the rotor opposite the same. The latter charge will, in turn, induce a positive charge on the lower surface of the rotor. However, there will be but a small charge induced on the lower portion of the rotor because of the great distance between the upper and lower parts of the rotor. As before stated I have illustrated the dielectric as comprising a thick shaded band between the upper and lower portions of the rotor, but it must be understood that the dielectric is not in this shape, and is thus illustrated solely for the purpose of explanation. The charge induced on the lower portion of the rotor is positive and will induce a negative charge on the lower stator element connected in phase with the upper stator element.

Thus, a small amount of current will flow through the receiving circuit. However, because there is a large impedance offered to the passage of any current from the upper to the lower stator at non-synchronous frequencies, but small current will flow in the receiving circuit. In fact, at non-synchronous frequencies, except at those frequencies closely approximating the synchronous frequency, under ordinary conditions the effect of the rotor would be practically the same as inserting an infinite resistance in the circuit.

In Figs. 3 to 6, inclusive, I have schematically illustrated the condition of the charges on the stator and rotor elements at synchronous speed.

Figure 5:
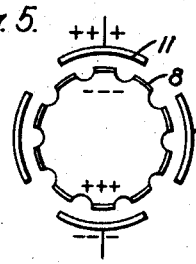
Fig. 5 is a similar view illustrating the condition of the apparatus at the end of one and a quarter cycles of alternation.
Figure 6:
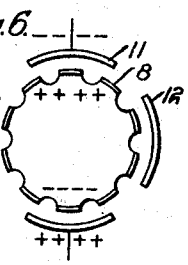
Fig. 6 is a similar view illustrating the condition of the apparatus at the end of one and three-quarters cycles of alternation.
Figure 7:
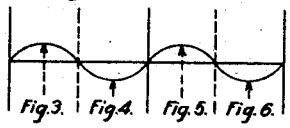
Fig. 7 is a curve diagram illustrating the points in the cycles of alternation in which the condition of the apparatus is diagrammatically shown in Figs. 3 to 6 inclusive.

Fig. 7 is a key to the points in the cycles of an alternating synchronous frequency at which times the condition of the apparatus is diagrammatically shown in Figs. 3 to 6. Let us assume that in Fig. 3 the rotor has just finished one-quarter cycle at synchronous speed. The applied voltage draws a negative charge to the upper part of the rotor and a positive charge is imparted to the lower part through the high resistance of the rotor. I have shown these changes on both rotor and stator as being small.

Figure 4:
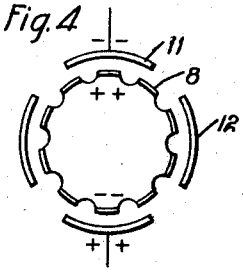
Fig. 4 is a similar view illustrating the condition at the end of the first three-quarters of a cycle of alternation.

At the end of the first three quarters of a cycle of alternation, as shown in Fig. 4, the voltage applied to the stator has reversed but so also has the position of the rotor so that the applied voltage continues to increase the charges on the rotor. Thus, with each half cycle the charges on the stators and rotor increase as seen in Figs. 4, 5 and 6. When finally the full charge is reached the impedance to currents of synchronous frequency is that of the two air gaps considered as dielectrics of series-connected condensers, instead of the much higher impedance comprising the two stator plates considered as a condenser, which obtains at non-synchronous frequencies.

Figure 8:
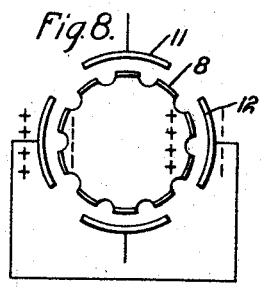
Fig. 8 is a diagrammatic view showing the operation of the stators which are short-circuited to bind on the charges.

In Fig. 8 is shown the purpose of the quarter-phase stators 12 which are short circuited by the connection 13. The purpose of these stators is to bind the charge on the rotor, and prevent leakage of the charge in passing from the position opposite the stators 11, to the next position opposite the stators 11.

By my tuner mechanism I have made it possible to tune very sharply, and have devised a mechanism which is of high selectivity and mechanically simple. Moreover, by means of my tuner, I may know exactly at what frequency to set the mechanism to receive any desired wave length or to resonate at an audio- or group-frequency, since the easily ascertained velocity of rotation of the rotor determines the frequency which may be received.

I claim as my invention:

1. A tuner mechanism comprising means rotating synchronously with and offering slight resistance to currents of desired frequency and high impedance at other frequencies.

2. A tuner mechanism comprising condenser members adapted to be charged by an oscillating current, means for inducing periodic charges on said condenser members, and means for determining the frequency of said charges, whereby it may be made to correspond to the frequency of said oscillating current and thereby cause the path between said condenser members to have small impedance to oscillations of desired frequency and high impedance to oscillations of other frequencies, said inducing means including an insulated device mounted between said condenser members.

3. A tuner mechanism comprising a source of oscillating current, an electrostatic generator comprising a rotor and a stator, conductors connecting said stator into circuit with said source of oscillating current and means for driving the rotor at various speeds including one corresponding to the frequency of said oscillating current, whereby small impedance is offered to oscillations of a frequency synchronous to the velocity of rotation of the rotor and large impedance to non-synchronous oscillations.

4. A tuner system comprising a source of oscillating current, an electrostatic generator comprising a rotor and a stator, said stator including separated segments, a circuit connected to certain of said segments and including said source of oscillating current and means for driving the rotor, at various speeds including one corresponding to the frequency of said oscillating current, whereby small impedance is offered to oscillations of a frequency synchronous to the velocity of rotation of the rotor and large impedance to oscillations of non-synchronous frequency.

5. A tuner system comprising a source of oscillating current, an electrostatic generator comprising a rotor and a stator, said stator including separated segments, a connection short-circuiting certain of said segments, a circuit connected to some of the remainder of said segments and including said source of oscillating current and means for driving the rotor at various speeds including one corresponding to the frequency of said oscillating current, whereby small impedance is offered to oscillations of a frequency synchronous to the velocity of rotation of the rotor and large impedance to oscillations of non-synchronous frequency.

6. A tuner system comprising a source of oscillating current, an electrostatic generator comprising a rotor and a stator, said stator including separated segments, a connection short-circuiting certain of said segments to bind the charges upon the portions of the rotor adjacent said segments, a circuit connected to some of the remainder of such segments and including said source of oscillating current and means for driving the rotor at various speeds including one corresponding to the frequency of said oscillating current, whereby small impedance is offered to oscillations of a frequency synchronous with the velocity of rotation of the rotor and large impedance to oscillations of non-synchronous frequency.

7. A tuner system comprising a source of oscillating current, an electrostatic generator comprising a rotor and a stator, each comprising segments insulated from one another, high resistance leakage paths connecting the segments of the rotor, a circuit including said source of oscillating current and certain of said stator segments and means for driving the rotor at various speeds including one corresponding to the frequency of said oscillating current, whereby small impedance is offered to oscillations of a frequency synchronous with the velocity of rotation of the rotor and large impedance to oscillations of non-synchronous frequency.

8. A tuner system comprising a source of oscillating current, an electrostatic generator comprising a rotor and a stator, each comprising segments insulated from one another, high resistance leakage paths connecting the segments of the rotor, a circuit including said source of oscillating current and certain of said stator segments and a short circuit connecting certain of the other segments of the stator to bind the charges on the portions of the rotor opposite them and means for driving the rotor at various speeds including one corresponding to the frequency of said oscillating current, whereby small impedance is offered to oscillations of a frequency synchronous to the velocity of rotation of the rotor and large impedance to oscillations of other frequency.

9. A tuner system comprising a source of oscillating current, an electrostatic generator comprising a rotor and a stator, said stator comprising members arranged in two phases, the stator members in one phase being short-circuited to bind the charges on the portions of the rotor adjacent thereto, a circuit including said source of oscillating current and certain of said stator segments, a short-circuit connecting certain of the other segments of the stator to bind the charges on the portions of the rotor opposite them and means for driving the rotor at various speeds including one corresponding to the frequency of said oscillating current, whereby small impedance is offered to oscillations of a frequency synchronous to the velocity of rotation of the rotor and large impedance to oscillations of non-synchronous frequencies.

10. A tuner system comprising a source of oscillating current, an electrostatic generator comprising a rotor and a stator, each comprising segments insulated from one another, the stator segments being arranged in two phases, the stator segments in one phase being short-circuited to bind the charges on the portions of the rotor adjacent thereto, a circuit including said source of oscillating current and certain of said stator segments and means for driving the rotor at various speeds including one corresponding to the frequency of said oscillating current, whereby small impedance is offered to oscillations of a frequency synchronous to the velocity of the rotation of the rotor and a large impedance to oscillations of non-synchronous frequencies.

11. A tuner system comprising a source of oscillating current, an electrostatic generator comprising a rotor and a stator, each comprising segments insulated from one another, high resistance leakage paths connecting the segments of the rotor, the segments of said stator being arranged in two phases, the stator segments in one phase being short circuited to bind the charges on the portion of the rotor adjacent thereto, a circuit including said source of oscillating current and the stator segments in the other phase and means for driving the rotor at various speeds including one corresponding to the frequency of said oscillating current whereby a small impedance is offered to oscillations of a frequency synchronous to the velocity of the rotation of the rotor and a large impedance to oscillations of other frequencies.

12. A receiving system comprising an antenna circuit, a receiving circuit coupled thereto, and an electrostatic generator connected in the receiving circuit, said generator comprising two relatively rotatable members, one of said members having insulated segments and the other being a polyphase member having segments of one phase adapted to be connected in circuit with the source of oscillating current and segments of another phase short-circuited to bind the charges on the said one member, whereby small impedance is offered to oscillations of a frequency synchronous to the velocity of the relative rotation of said one member and large impedance to oscillations of other frequencies.

13. A receiving system comprising an antenna circuit, a receiving circuit coupled thereto, and an electrostatic generator connected in the receiving circuit, said generator comprising two relatively rotatable members one of said members having insulated segments provided with small leakage paths connecting said segments and the other being a polyphase member having segments connected in circuit with the source of oscillating current and segments of another phase short-circuited to bind the charges on said one member, whereby small impedance is offered to currents of a frequency synchronous to the velocity of the relative rotation of said one member and large impedance to currents of other frequencies.

14. The combination with an electrical circuit tending to carry currents of different frequencies, of a tuning device comprising an electrostatic generator including periodically acting members and means for adjusting the period in which said members act.

15. The combination with an electrical circuit tending to carry currents of different frequencies, of a selective impedance device comprising an electrostatic generator rotating at a speed which is synchronous with respect to one of said frequencies.

16. The combination with a circuit tending to carry currents of different frequencies, of a selective impedance device comprising an electrostatic generator, said generator comprising two relatively rotatable members one of said members having a plurality of pairs of segments, at least one of said pairs of segments being connected in said electrical circuit, and the other of said members having insulated segments cooperating therewith and rotating at such speed that a segment of said other member will pass from one segment to the other segment of a pair of said first-named segments during one-half cycle of current of the desired frequency.

17. The combination with a circuit tending to carry currents of different frequencies, of a selective impedance device comprising an electrostatic generator, said generator comprising a stationary member having a plurality of pairs of segments, one of said pairs of segments being connected in said electrical circuit, and a rotatable member having insulated segments cooperating therewith and rotating at such speed that a segment of the rotatable member will pass from one segment to the other segment of said pair of stationary segments during one-half cycle of current of the desired frequency, and means associated with other pairs of said stationary segments for binding the charges on the rotating segments.

18. A tuner mechanism comprising rotating means offering slight and substantially constant impedance to currents of the desired frequency and high impedance to currents of other frequencies.

In testimony whereof, I have hereunto subscribed my name this 20th day of July, 1921.

JOSEPH SLEPIAN